(12) United States Patent
Vyas

(10) Patent No.: US 11,277,376 B2
(45) Date of Patent: Mar. 15, 2022

(54) SYSTEMS AND METHODS FOR UTILIZING AN INTERNET PROTOCOL (IP) ADDRESS SCANNING MODEL TO IDENTIFY AVAILABLE IP ADDRESSES

(71) Applicant: Verizon Patent and Licensing Inc., Basking Ridge, NJ (US)

(72) Inventor: Sanjay Ravi Vyas, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 99 days.

(21) Appl. No.: 16/904,220

(22) Filed: Jun. 17, 2020

(65) Prior Publication Data

US 2021/0400013 A1    Dec. 23, 2021

(51) Int. Cl.
*G06F 15/16* (2006.01)
*H04L 61/5007* (2022.01)
*H04L 43/10* (2022.01)

(52) U.S. Cl.
CPC .......... *H04L 61/2007* (2013.01); *H04L 43/10* (2013.01)

(58) Field of Classification Search
CPC ............... H04L 45/123; H04L 67/1036; H04L 63/1441; H04L 61/2007; H04L 43/0805; H04L 43/10
USPC ....................................................... 709/245
See application file for complete search history.

(56) References Cited

U.S. PATENT DOCUMENTS

2020/0177459 A1* 6/2020 Berman .................. H04L 67/18

FOREIGN PATENT DOCUMENTS

WO    WO-0195564 A2 * 12/2001 ............. H04L 69/40

OTHER PUBLICATIONS

IMS Threat and Attack Surface Analysis Using Common Vulnerability Scoring System Sami Petajasoja;Heikki Kortti;Ari Takanen;Juha-Matti Tirila 2011 IEEE 35th Annual Computer Software and Applications Conference Workshops Year: 2011 | Conference Paper | Publisher: IEEE (Year: 2011).*

* cited by examiner

*Primary Examiner* — Oscar A Louie
*Assistant Examiner* — Oluwatosin M Gidado

(57) ABSTRACT

In some implementations, an audit platform may determine a first availability of a particular IP address based on data identifying IP addresses assigned for wireless and/or wireline services, a second availability of the particular IP address based on data identifying contact and registration information for IP addresses, and a third availability of the particular IP address based on data identifying active IP addresses associated with a backbone router. The audit platform may determine a fourth availability of the particular IP address based on data identifying responses to ping commands associated with the IP addresses, and a fifth availability of the particular IP address based on data identifying responses to traceroute commands associated with the IP addresses. The audit platform may calculate a confidence score, indicating a confidence level that the particular IP address is available, based on the first availability, second availability, third availability, fourth availability, and fifth availability.

20 Claims, 15 Drawing Sheets

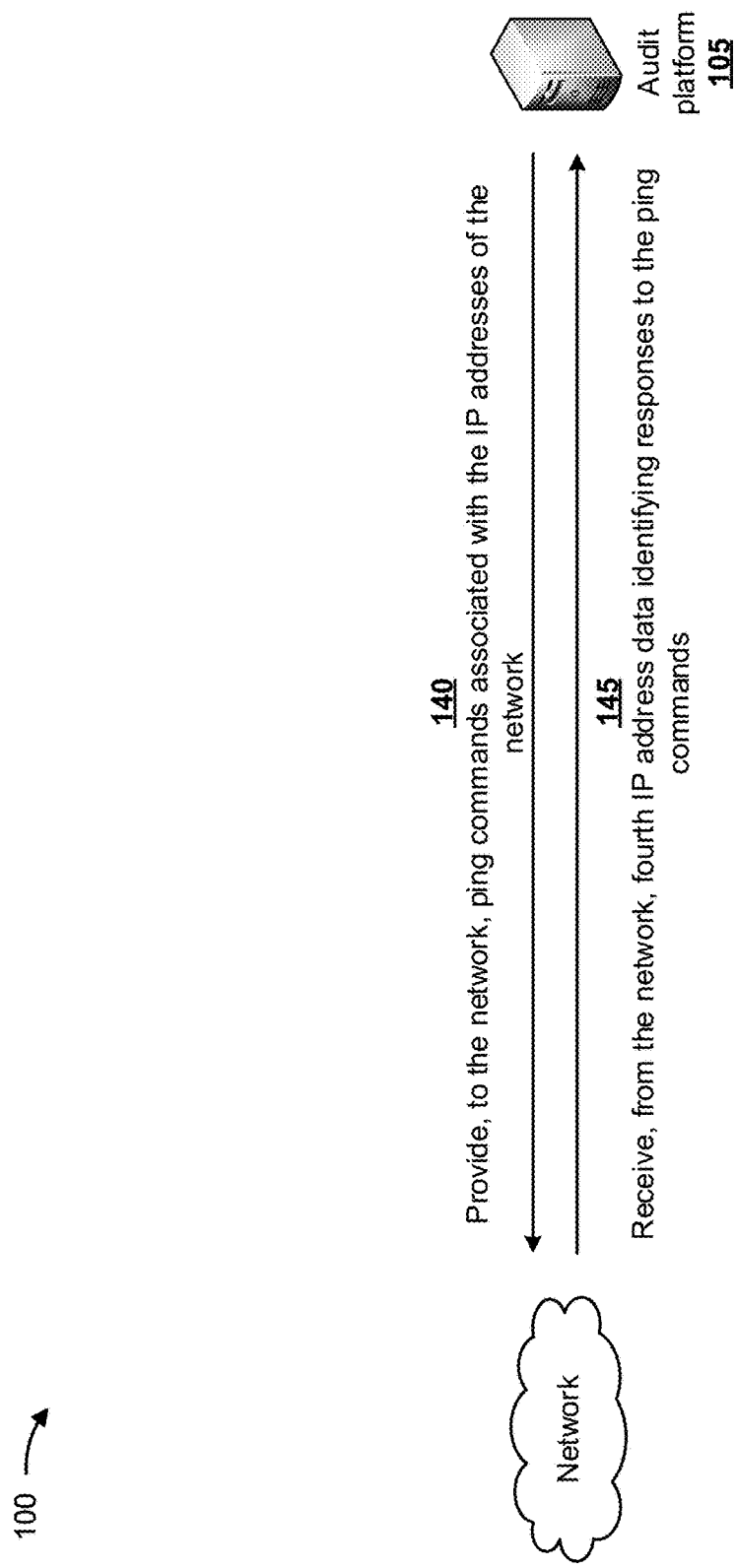

SYSTEMS AND METHODS FOR UTILIZING AN INTERNET PROTOCOL (IP) ADDRESS SCANNING MODEL TO IDENTIFY AVAILABLE IP ADDRESSES

BACKGROUND

An Internet Protocol (IP) address may be assigned to a device that is connected to a network (e.g., a network that uses the IP communications protocol for data communication). The IP address may identify the device and provide the location of the device in the network, and may thus provide the capability of establishing a path to the device.

BRIEF DESCRIPTION OF THE DRAWINGS

FIGS. 1A-1L are diagrams of an example implementation described herein.

DETAILED DESCRIPTION OF PREFERRED EMBODIMENTS

Figure 1A:
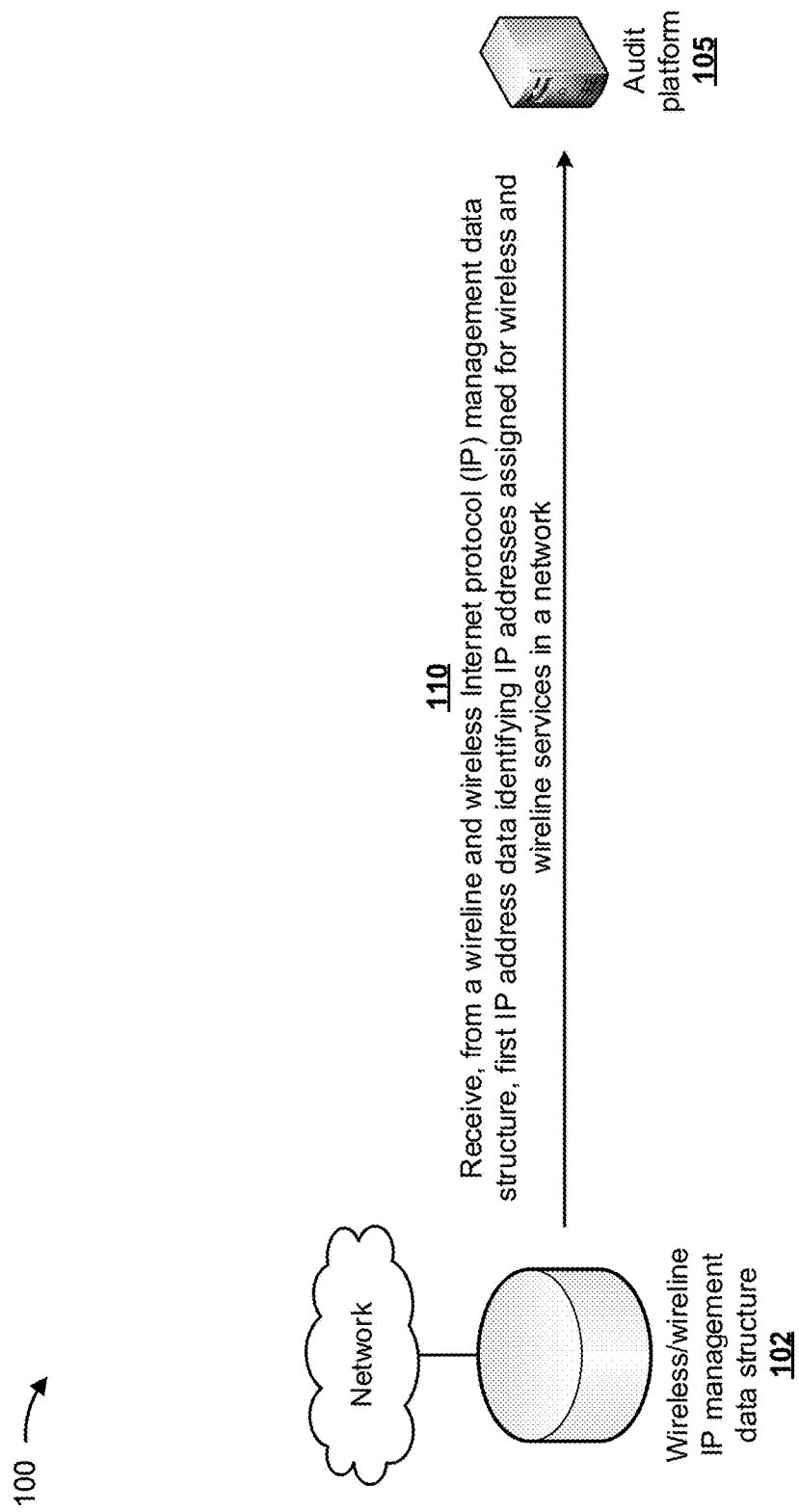

The following detailed description of example implementations refers to the accompanying drawings. The same reference numbers in different drawings may identify the same or similar elements.

A network provider (e.g., a telecommunications network provider) may receive an order from a new customer (e.g., an individual or business entity that orders a new product or service). For example, the new customer may order a dedicated Internet connection. Based on receiving the order, the network provider may allocate one or more IP addresses to the new customer (e.g., for a router associated with the dedicated Internet connection). When allocating the IP addresses, the network provider may refer to an Internet number asset management (INAM) database to determine whether the IP addresses are already in use by another entity (e.g., a different customer). However, because the INAM database includes a large number (e.g., millions) of IP addresses that are frequently subject to being allocated, and is distributed over multiple physical locations that may not be synchronized (e.g., updated in real-time) relative to each other, the network provider may fail to identify a situation in which the IP address is already allocated to another entity, and may allocate the IP address to the new customer. As a result, the same IP address may be allocated to two different entities, which can cause data to be received by the wrong entity, prevent data from being received by the correct entity, and/or the like. This, in turn, wastes computing resources (e.g., processing resources, memory resources, communication resources, and/or the like) and/or the like associated with an inability to perform important functions that require the data, additional efforts required to obtain and/or re-send the data, compromised security due to the data being sent to the wrong entity, and/or the like.

Some implementations described herein provide an audit platform that utilizes an IP address scanning model to identify available IP addresses for new customers. For example, the audit platform may receive first Internet protocol (IP) address data identifying IP addresses assigned for wireless and/or wireline services in a network, and determine a first availability of a particular IP address based on the first IP address data. The audit platform may receive second IP address data identifying contact and registration information for IP addresses in the network, and determine a second availability of the particular IP address based on the second IP address data. The audit platform may receive third IP address data identifying active IP addresses associated with a backbone router of the network, and determine a third availability of the particular IP address based on the third IP address data. The audit platform may provide, to the network, ping commands associated with the IP addresses of the network. The audit platform may receive, from the network, fourth IP address data identifying responses to the ping commands, and determine a fourth availability of the particular IP address based on the fourth IP address data. The audit platform may provide, to the network, traceroute commands associated with the IP addresses of the network. The audit platform may receive, from the network, fifth IP address data identifying responses to the traceroute commands, and determine a fifth availability of the particular IP address based on the fifth IP address data. The audit platform may calculate a confidence score, indicating a confidence level that the particular IP address is available, based on the first availability, the second availability, the third availability, the fourth availability, and the fifth availability. The audit platform may perform one or more actions based on the confidence score.

In this way, the audit platform reduces the possibility that a customer will be allocated an IP address that is already allocated to another entity. This reduces the chance of the same IP address being used by two different entities, and thus decreases the chance that data will be received by the wrong entity, will not be received by the correct entity, and/or the like. As a result, the audit platform conserves computing resources (e.g., processing resources, memory resources, communication resources, and/or the like) and/or the like that would otherwise be wasted due to an inability to perform important functions that require the data, additional efforts required to obtain and/or re-send the data, lost business due to dissatisfied customers, compromised security due to the data being sent to the wrong entity, and/or the like.

FIGS. 1A-1L are diagrams of an example 100 associated with utilizing an IP address scanning model to identify available IP addresses for new customers. As shown in FIGS. 1A-1L, example 100 includes an audit platform 105. Audit platform 105 may utilize the address scanning model to identify available IP addresses for new customers of a product and/or service provider (e.g., a telecommunications provider). The new customers may be individuals or organizations who order new products and/or services that require IP addresses. For example, audit platform 105 may identify available IP addresses for a new customer of a telecommunications provider who places an order for a dedicated Internet connection. Upon identifying an available IP address, audit platform 105 may assign and/or allocate the IP address to the new customer (e.g., for a router associated with the dedicated Internet connection).

In some implementations, the IP address scanning model utilized by audit platform 105 may employ a five-step IP address scanning algorithm, as described below. Although the steps of the algorithm are described in a particular order, the steps may be performed in a different order than described. Additionally, or alternatively, the five-step IP address scanning algorithm may include additional steps, and/or may include a portion, but not all, of the steps described. In some implementations, steps of the algorithm may be performed or may not be performed based on a result of performing one or more other steps of the algorithm.

Figure 1B:
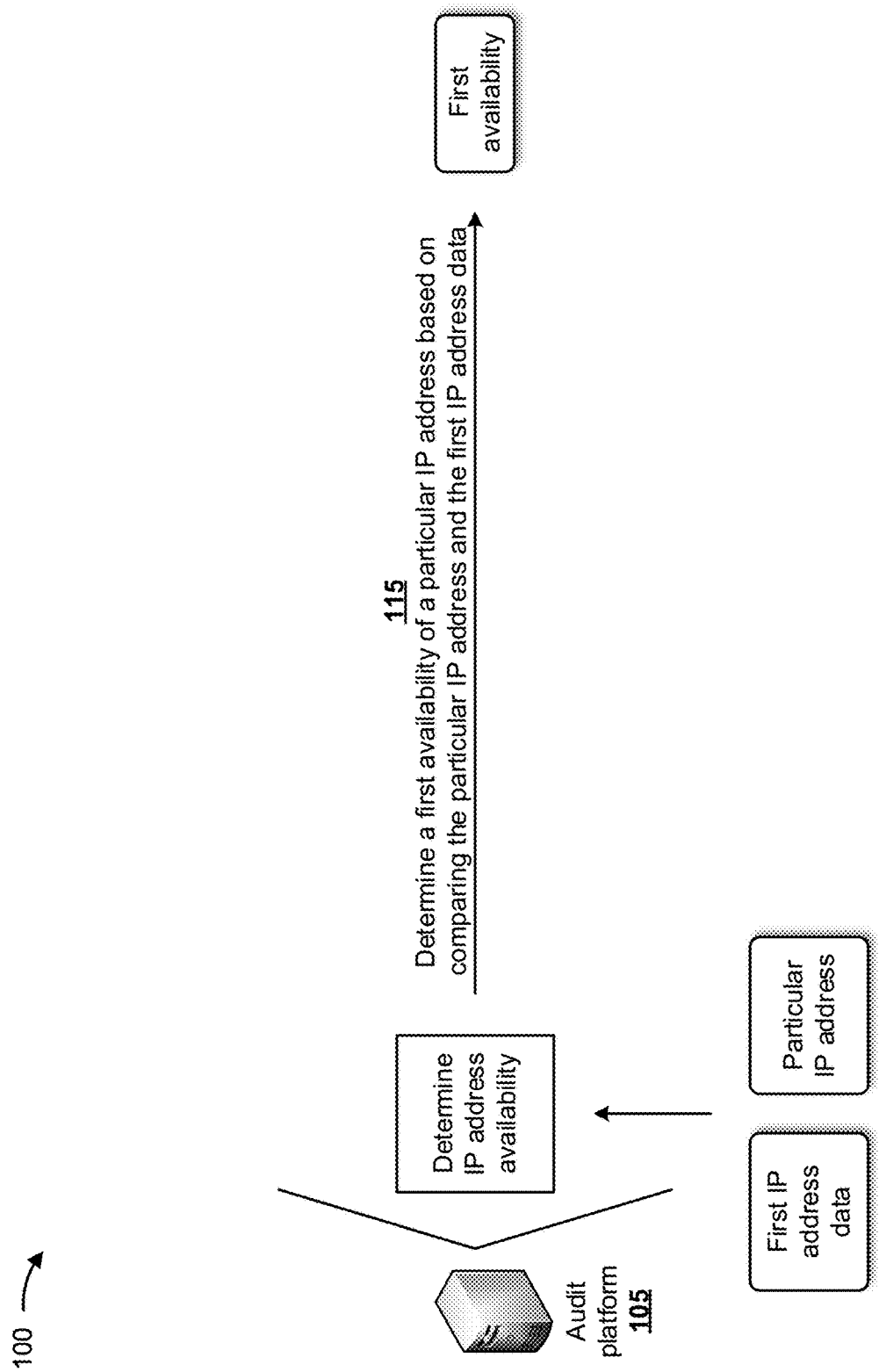

Audit platform 105 may utilize the IP address scanning model to perform the functions described in FIGS. 1A and 1B as a first step of the five-step IP address scanning algorithm to identify an available IP address for a new customer. As shown in FIG. 1A, and by reference number 110, audit platform 105 may receive, from a wireless/wireline IP management data structure 102, first IP address data identifying IP addresses assigned for wireless and/or wireline services in a network. Wireless/wireline IP management data structure 102 may include a repository (e.g., a golden repository) for IP addresses acquired by the product and/or service provider associated with audit platform 105. In some implementations, wireless/wireline IP management data structure 102 may be an external data structure (e.g., a database external to the product and/or service provider) or a local data structure (e.g., a database local to the product and/or service provider). In some implementations, wireless/wireline IP management data structure 102 includes or is associated with an Internet number asset management (INAM) database.

As shown in FIG. 1B, and by reference number 115, audit platform 105 may determine a first availability of a particular IP address (e.g., "available" or "unavailable") based on comparing the particular IP address and the first IP address data. For example, the product and/or service provider, the new customer, and/or audit platform 105 may select the particular IP address (e.g., from a list of potentially available IP addresses that have been acquired by the product and/or service provider) as a candidate IP address to be assigned to the new customer. In some implementations, the selection of the IP address may be based on the customer location, a type of router to be used, and/or the like. The audit platform 105 may determine the first availability by comparing the particular IP address to IP addresses in wireless/wireline IP management data structure 102 to identify whether the particular IP address has already been assigned to another customer. If the particular IP address has already been assigned to another customer, audit platform 105 may determine the first availability to be "unavailable". If the particular IP address has not already been assigned to another customer, audit platform 105 may determine the first availability to be "available".

In some implementations, audit platform 105 proceeds to the second step of the algorithm regardless of whether the first availability is determined to be "available" or "unavailable". Alternatively, audit platform 105 may proceed to the second step of the algorithm only if the first availability is determined to be "available". In this case, if audit platform 105 determines that the first availability is "unavailable", audit platform 105 may eliminate the particular IP address as a candidate IP address to be assigned to the new customer, may select a new particular IP address as a candidate IP address to be assigned to the new customer, and may begin the five-step IP address scanning algorithm again with a new particular IP address.

Figure 1C:
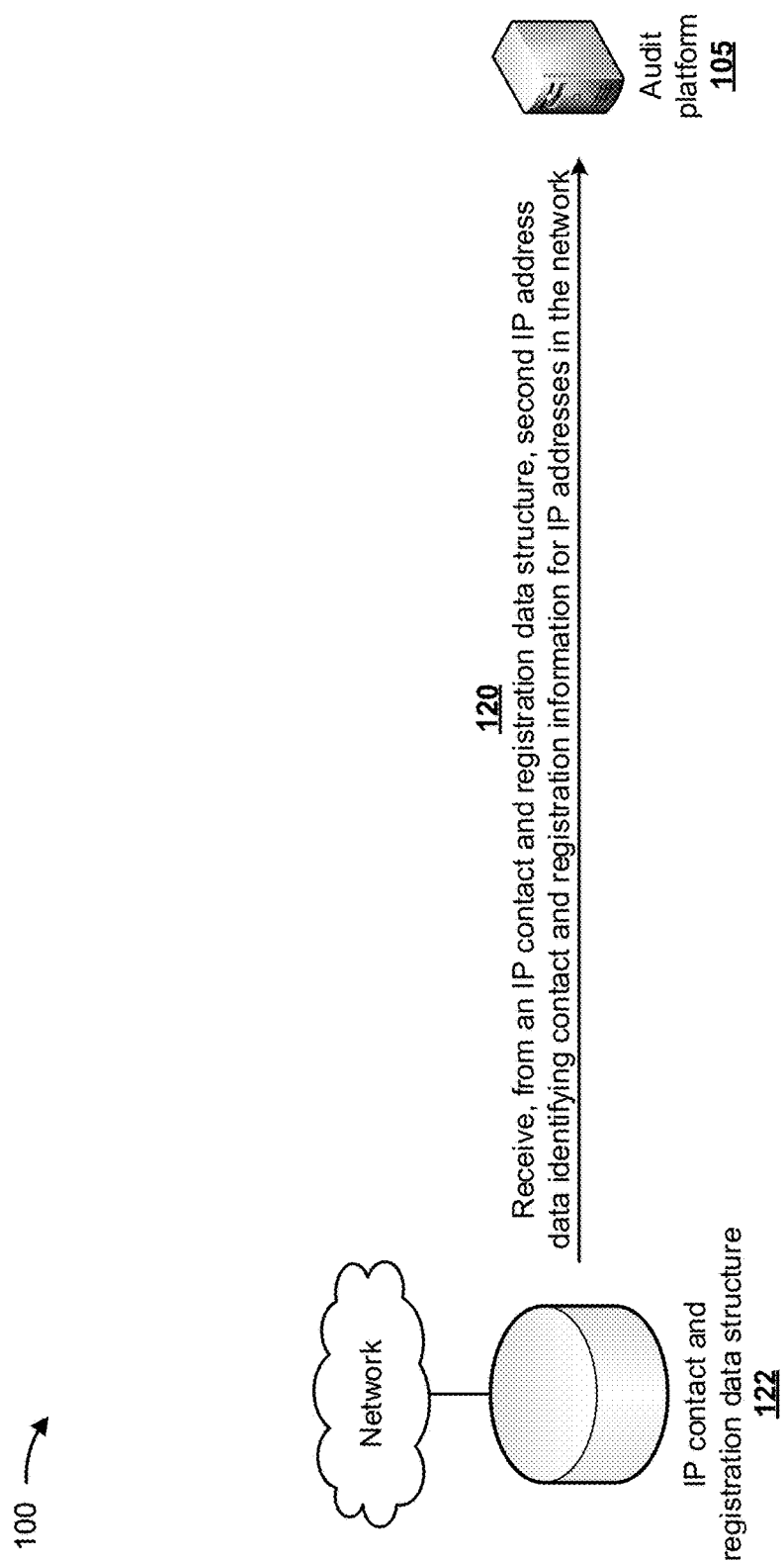
Figure 1D:
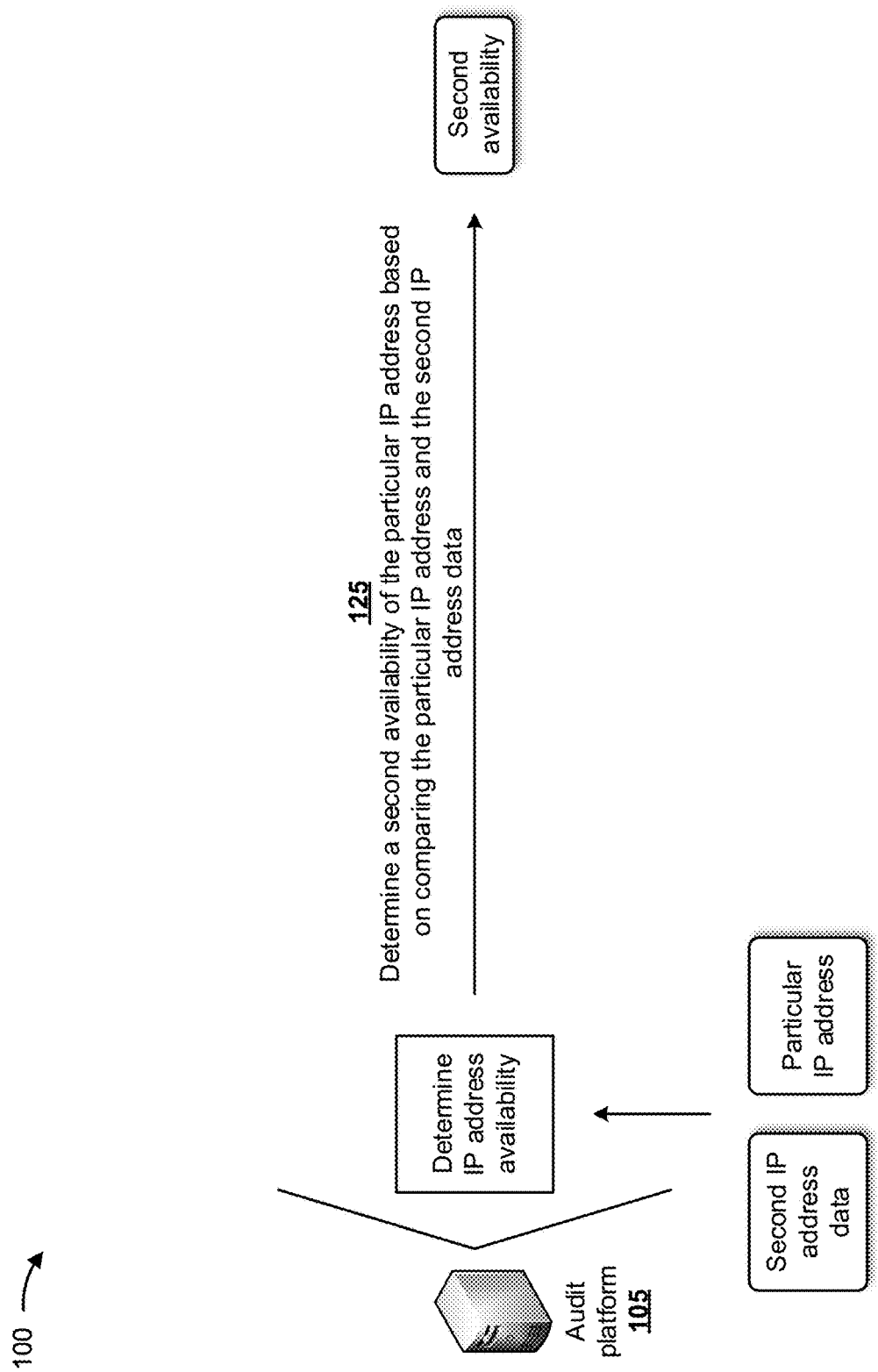

Audit platform 105 may utilize the IP address scanning model to perform the functions described in FIGS. 1C and 1D as a second step of the IP algorithm to identify an available IP address for a new customer. As shown in FIG. 1C, and by reference number 120, audit platform 105 may receive, from an IP contact and registration data structure 122, second IP address data identifying contact and registration information for IP addresses in the network. In some implementations, IP contact and registration data structure 122 includes an Internet registry. For example, IP contact and registration data structure 122 may include a regional Internet registry, such as the American Registry for Internet Numbers (ARIN). The Internet registry may include a user interface and/or protocol for searching for information associated with IP addresses. For example, ARIN includes a WHOIS service and a registry data access protocol (RDAP) that provide a mechanism for finding contact and registration information associated with an IP address. As a particular example, audit platform 105 may access the URL "search.arin.net/RDAP" to obtain the second IP address data. In some implementations, audit platform 105 accesses the Internet registry via an application programming interface (API).

As shown in FIG. 1D, and by reference number 125, audit platform 105 may determine a second availability of the particular IP address based on comparing the particular IP address and the second IP address data. Continuing with the above example, upon accessing the URL "search.arin.net/RDAP", audit platform 105 may provide the particular IP address. If the particular IP address has already been assigned to another entity, the search may return a result that includes an identification of the other entity. In this case, audit platform 105 may determine the second availability to be "unavailable". If the particular IP address does not already belong to another entity, the search may not return a result. For example, ARIN may return the string "No results found." In this case, audit platform 105 may determine the second availability to be "available".

In some implementations, audit platform 105 proceeds to the third step of the algorithm regardless of whether the second availability is determined to be "available" or "unavailable". Alternatively, audit platform 105 may proceed to the third step only if the second availability is determined to be "available". In this case, if audit platform 105 determines that the second availability is "unavailable", audit platform 105 may eliminate the particular IP address as a candidate IP address to be assigned to the new customer, may select a new particular IP address as a candidate IP address to be assigned to the new customer, and may begin the five-step IP address scanning algorithm again with a new particular IP address.

Figure 1E:
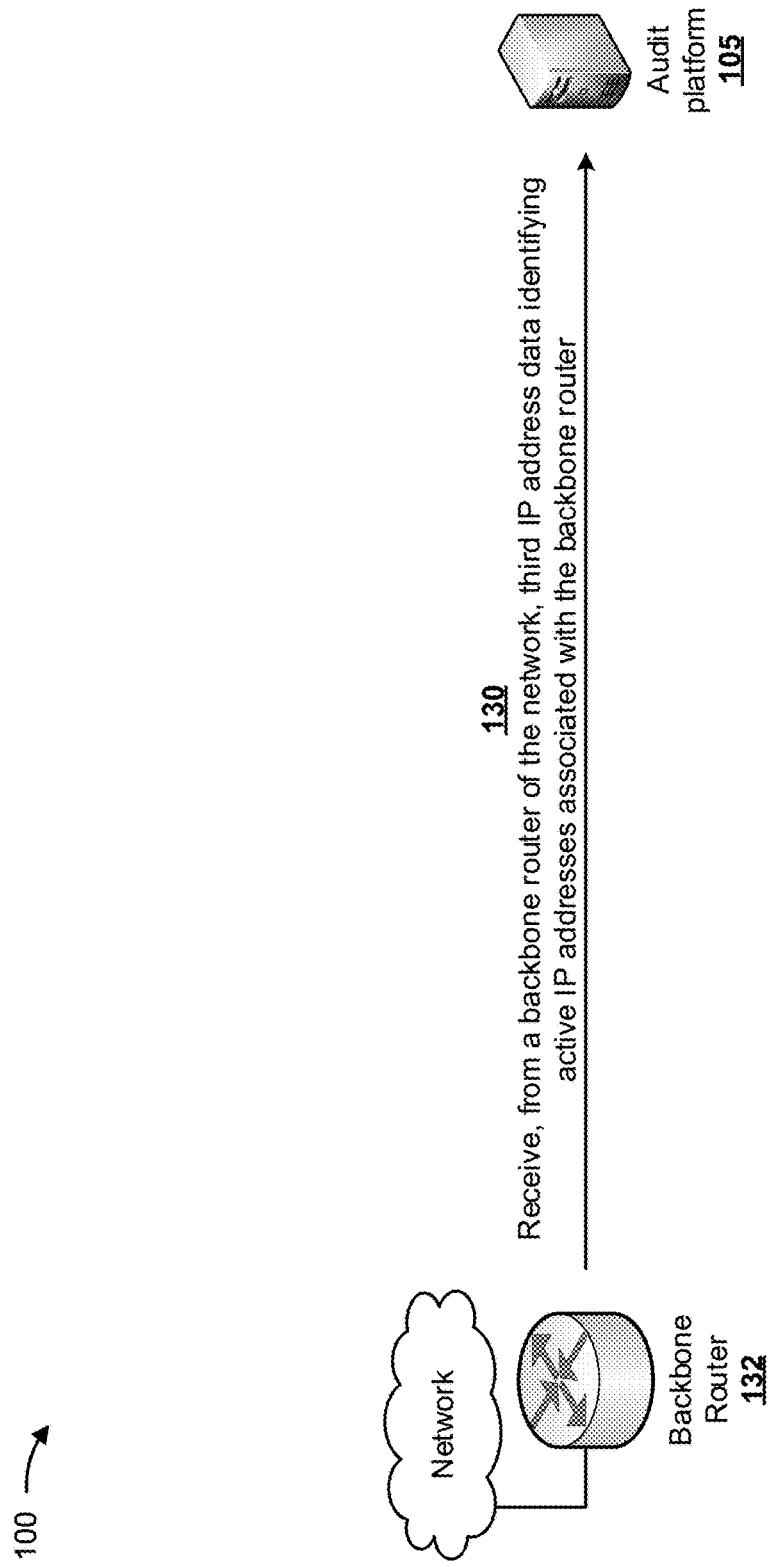
Figure 1F:
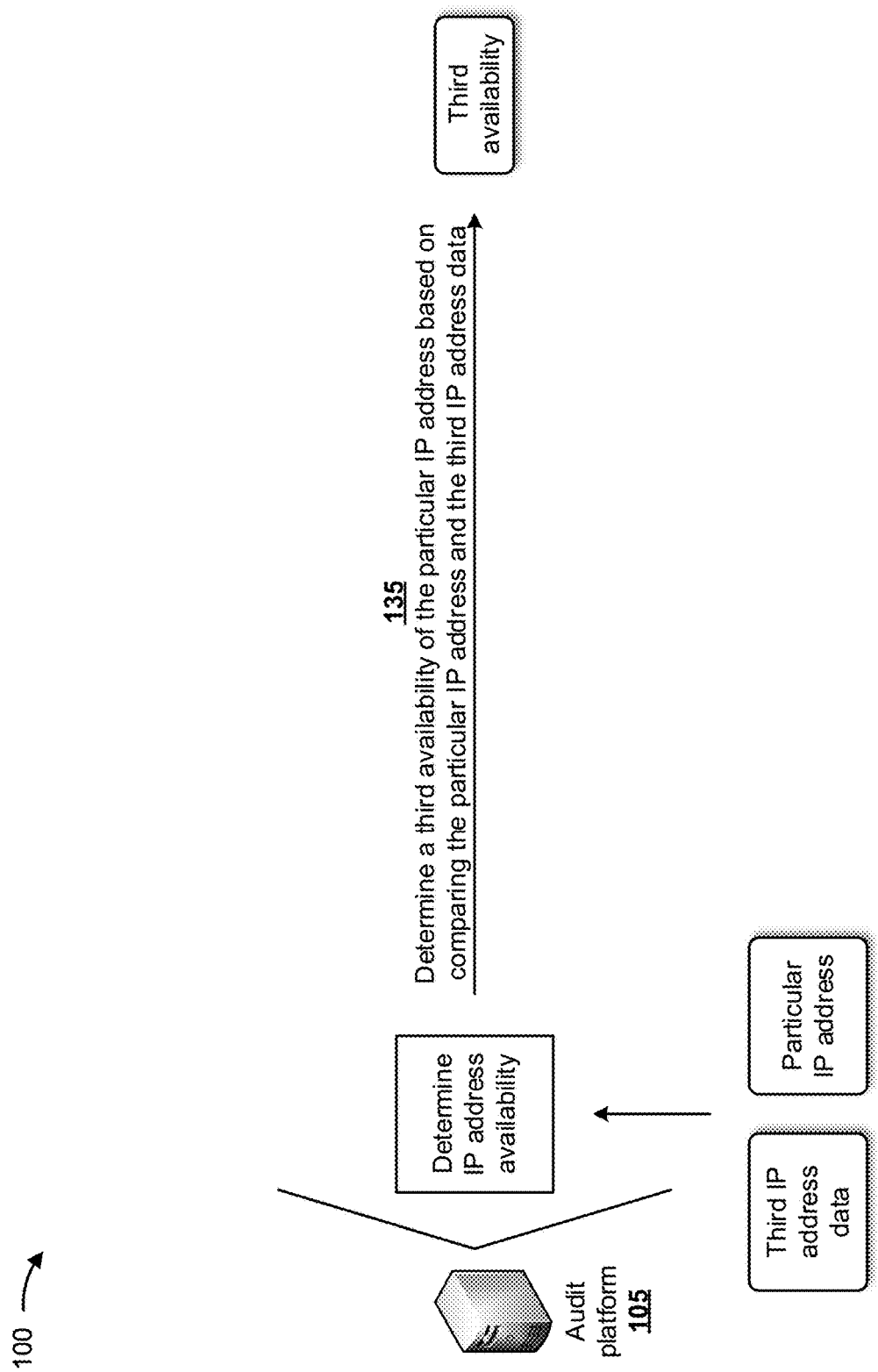

Audit platform 105 may utilize the IP address scanning model to perform the functions described in FIGS. 1E and 1F as a third step of the IP address scanning algorithm to identify an available IP address for a new customer. As shown in FIG. 1E, and by reference number 130, audit platform 105 may receive, from a backbone router 132 of the network, third IP address data identifying active IP addresses associated with backbone router 132. For example, audit platform 105 may receive a router feed from backbone router 132 that includes information identifying IP addresses of routers that communicate data via backbone router 132. In some implementations, audit platform 105 may receive the router feed from backbone router 132 periodically (e.g., about every 2 hours). As backbone router 132 connects a multitude of networks, the router feed may include the IP addresses of all routers that communicate data from one connected network to another connected network.

In some implementations, audit platform 105 determines router feed keywords and IP address keywords associated with the backbone router 132. The router feed keywords and IP address keywords may enable backbone router 132, a database associated with backbone router 132, and/or the like to identify the active IP addresses in a manner required by particular configurations of the routers (e.g., based on a manufacturer of each router, a type of each router, and/or the like) on the network. Audit platform 105 may provide (e.g., to backbone router 132, the database, and/or the like) queries that identify the router feed keywords and the IP address keywords, and may receive (e.g., from backbone router 132, the database, and/or the like), the third IP address data identifying the active IP addresses associated with backbone router 132 of the network based on the queries.

As shown in FIG. 1F, and by reference number 135, audit platform 105 may determine a third availability of the particular IP address based on comparing the particular IP address and the third IP address data. In some implementations, audit platform 105 may compare the third IP address data with all IP addresses that could be used by a router associated with the particular IP address. For example, audit platform 105 may identify an IP address in classless interdomain routing (CIDR) notation (e.g., 152.63.39.9/30 for a particular IP address 152.63.39.9) to determine that a router is associated with four IP addresses (152.63.39.9, 152.63.39.10, 152.63.39.11, and 152.63.39.12), and may compare the third IP address data with all four IP addresses. If audit platform 105 identifies one or more of the IP addresses associated with the particular IP address as active IP addresses in the router feed, audit platform 105 may determine the third availability to be "unavailable". If audit platform 105 does not identify any of the IP addresses associated with the particular IP address as active IP addresses in the router feed, audit platform 105 may determine the third availability to be "available".

In some implementations, audit platform 105 proceeds to the fourth step of the algorithm regardless of whether the third availability is determined to be "available" or "unavailable". Alternatively, audit platform 105 may proceed to the fourth step of the algorithm only if the third availability is determined to be "available". In this case, if audit platform 105 determines that the third availability is "unavailable", audit platform 105 may eliminate the particular IP address as a candidate IP address to be assigned to the new customer, may select a new particular IP address as a candidate IP address to be assigned to the new customer, and may begin the IP address scanning algorithm again with a new particular IP address.

Figure 1H:
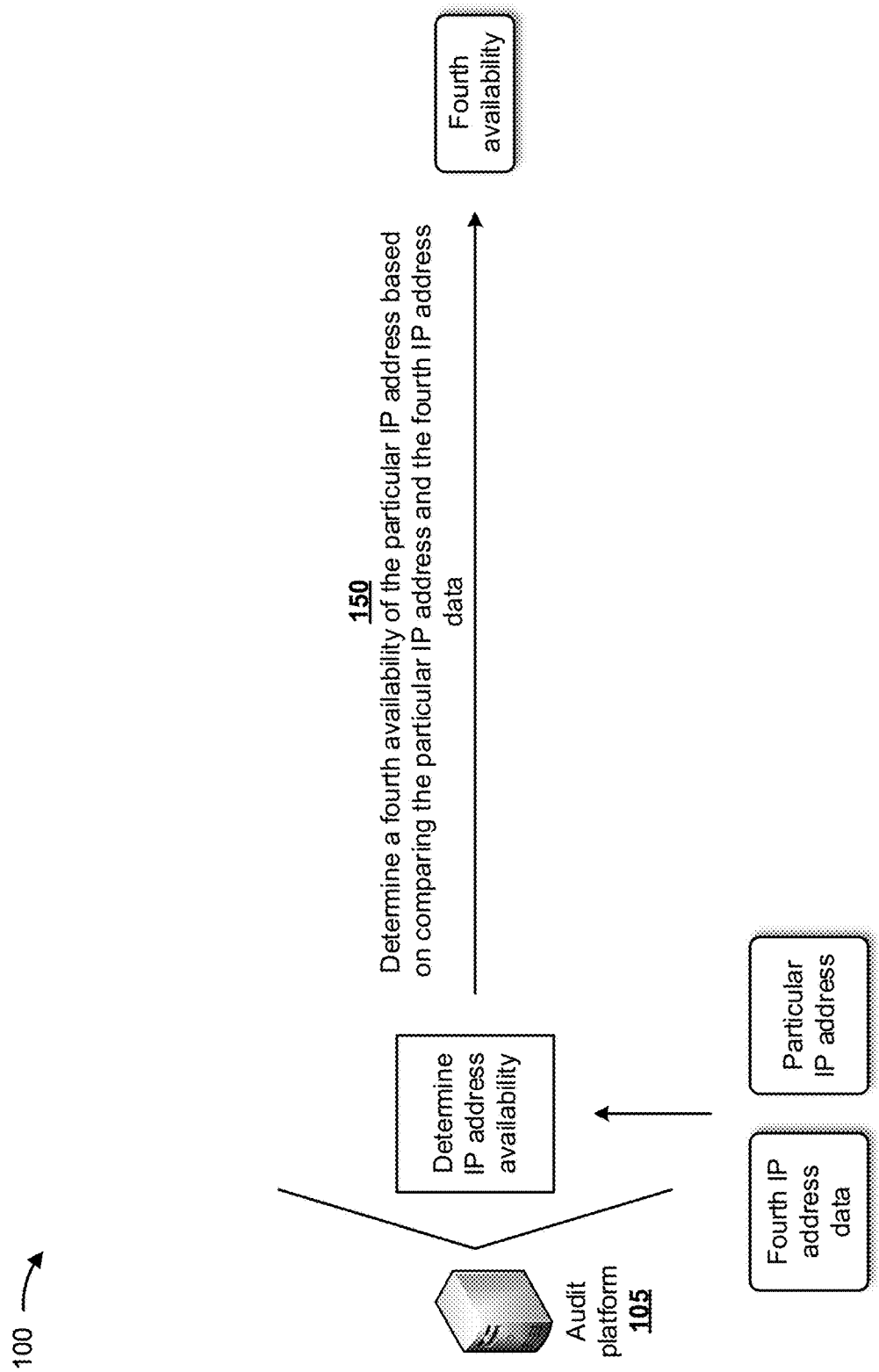

Audit platform 105 may utilize the IP address scanning model to perform the functions described in FIGS. 1G and 1H as a fourth step of the IP address scanning algorithm to identify an available IP address for a new customer. As shown in FIG. 1G, and by reference number 140, audit platform 105 may provide, to the network, ping commands associated with the IP addresses of the network. For example, audit platform 105 may provide a ping command that includes the particular IP address. Ping is a computer network administration software utility used to test the reachability of a device on an IP network. As shown by reference number 145, audit platform 105 may receive, from the network, fourth IP address data identifying responses to the ping commands. For example, audit platform 105 may receive a response to the ping command that includes an indication of a round trip time (from the source to the destination and back to the source), a number of packets transmitted, a number of packets received, and a percentage packet loss.

As shown in FIG. 1H, and by reference number 150, audit platform 105 may determine a fourth availability of the particular IP address based on comparing the particular IP address and the fourth IP address data. For example, audit platform 105 may determine the fourth availability of the particular IP address based on the percentage packet loss indicated by the response to the ping command for the particular IP address. If the response indicates a less than 100% packet loss (i.e., some packets were received), audit platform 105 may determine that the particular IP address is in use, and thus may determine the particular IP address to be "unavailable". If the response indicates a 100% packet loss, the audit platform 105 may determine that the particular IP address is not in use, and thus may determine the particular IP address to be "available". Additionally, or alternatively, if no response to the ping command is received, audit platform 105 may determine the particular IP address to be "available", "unknown", and/or the like.

In some implementations, audit platform 105 proceeds to the fifth step of the algorithm regardless of whether the fourth availability is determined to be "available" or "unavailable". Alternatively, audit platform 105 may proceed to the fifth step of the algorithm only if the fourth availability is determined to be "available". In this case, if audit platform 105 determines that the fourth availability is "unavailable", audit platform 105 may eliminate the particular IP address as a candidate IP address to be assigned to the new customer, may select a new particular IP address as a candidate IP address to be assigned to the new customer, and may begin the five-step IP address scanning algorithm again with a new particular IP address.

Figure 1I:
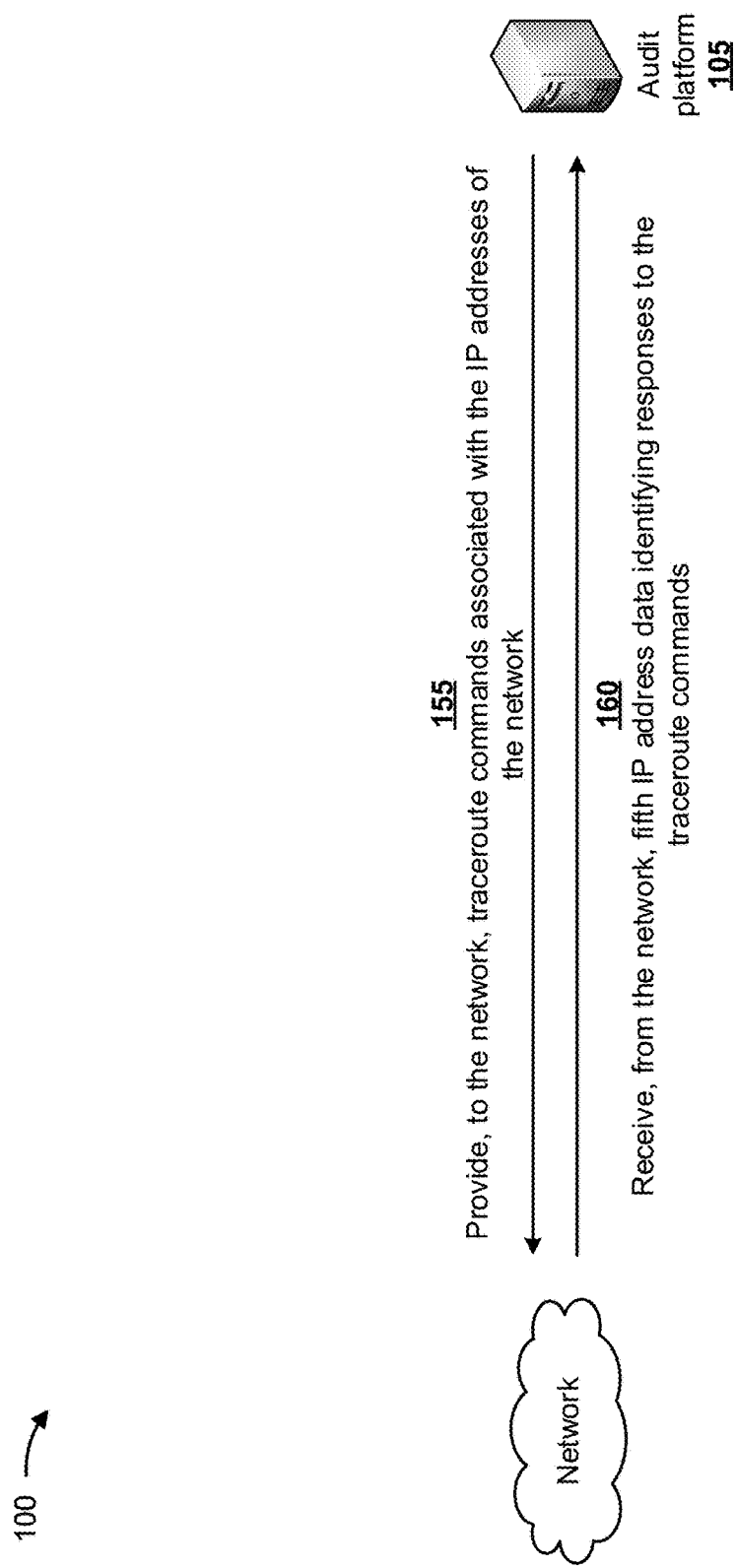
Figure 1J:
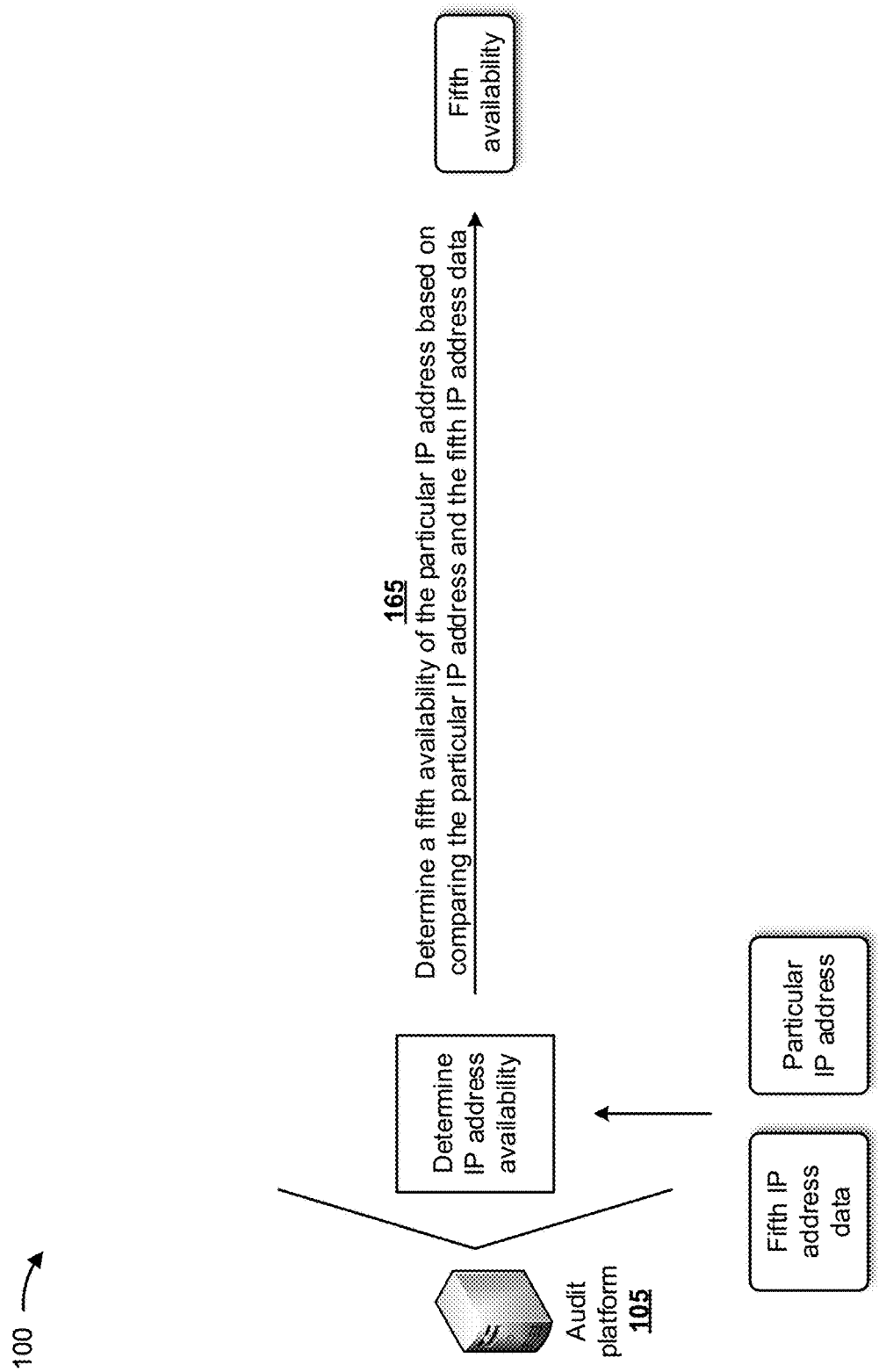
Figure 1K:
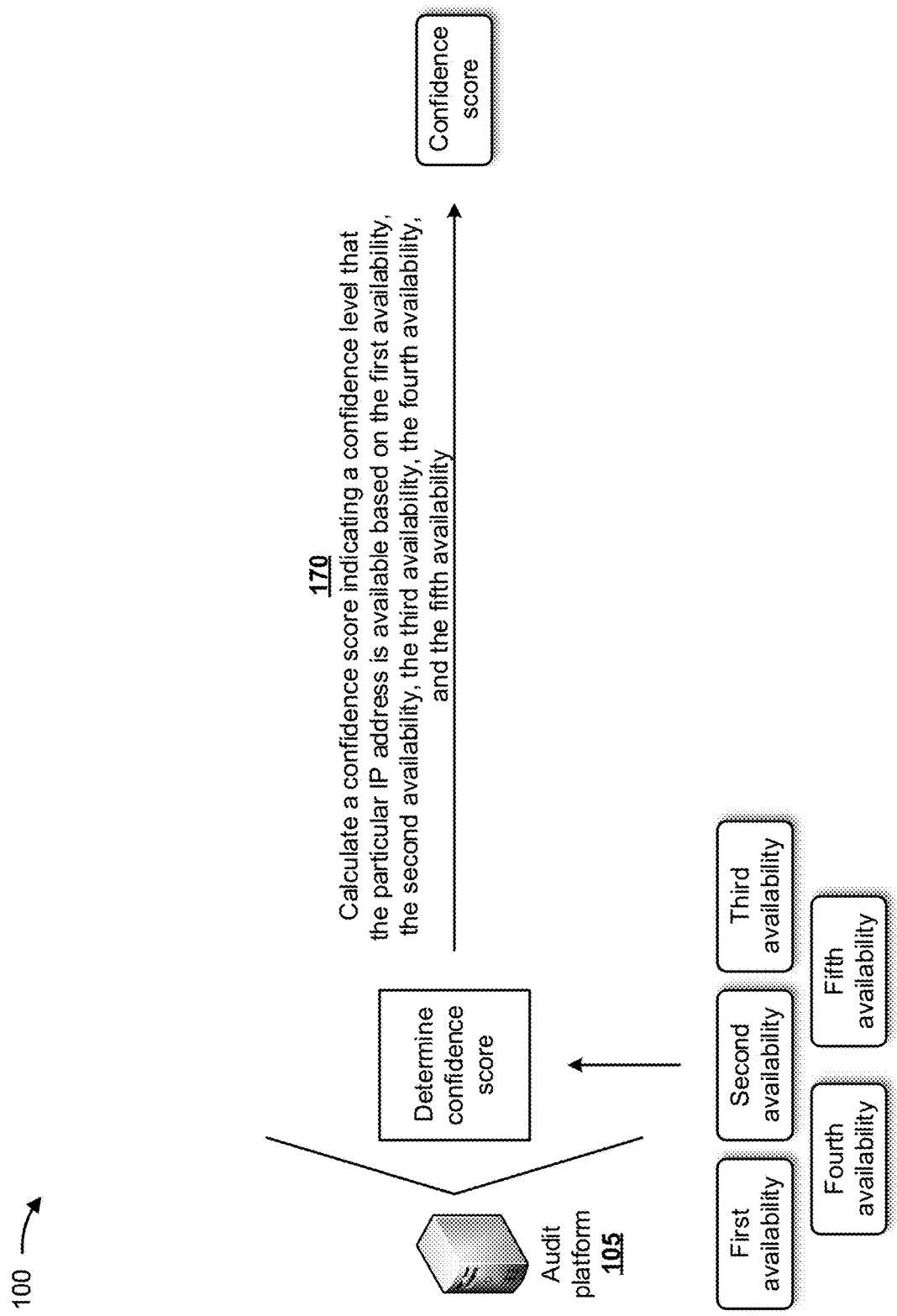
Figure 1L:
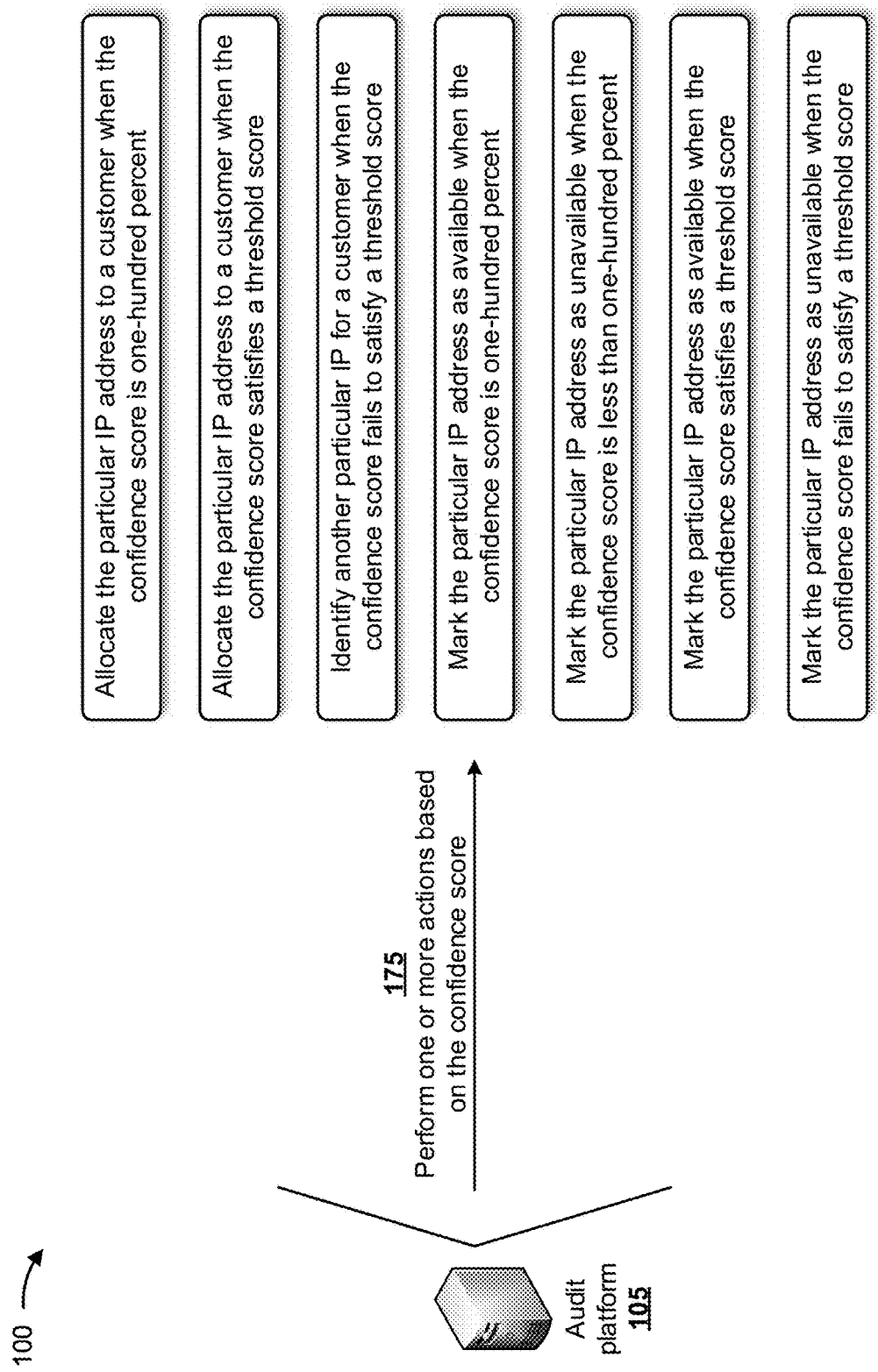

Audit platform 105 may utilize the IP address scanning model to perform the functions described in FIGS. 1L and 1J as a fifth step of the IP address scanning algorithm to identify an available IP address for a new customer. As shown in FIG. 1I, and by reference number 155, audit platform 105 may provide, to the network, traceroute commands associated with the IP addresses of the network. A traceroute (or tracert) command is a computer network diagnostic command that invokes a trace of a route to a specified IP address to obtain information associated with the route. In this case, audit platform 105 may provide a traceroute command that includes the particular IP address as the specified address. As shown by reference number 160, audit platform 105 may receive, from the network, fifth IP address data identifying responses to the traceroute commands. The fifth IP address data may include an identification of each successive router in the route, an amount of time taken by each hop from router to router, and/or the like.

As shown in FIG. 1J, and by reference number 165, audit platform 105 may determine a fifth availability of the particular IP address based on comparing the particular IP address and the fifth IP address data. In some implementations, audit platform 105 determines a fifth availability of the particular IP address based on a number of hops indicated in the response to the traceroute command. For example, audit platform 105 may define a threshold number of hops, and may determine the fifth availability based on comparing the threshold number of hops and the number of hops indicated in the response to the traceroute command. If the response indicates that the particular IP address was reached in a number of hops less than the threshold quantity of hops, audit platform 105 may determine that the particular IP address is not in use, and may therefore determine that the fifth availability is "available". For example, if the threshold number of hops is 15, and the traceroute reaches the particular IP address in 10 hops, then audit platform 105 may determine that the fifth availability is "available". If the response indicates that the particular IP address was reached in a number of hops greater than or equal to the threshold quantity of hops associated with a corresponding one or more of the IP addresses of the network, then audit platform 105 may determine that the particular IP address is in use, and may therefore determine that the fifth availability is "unavailable". For example, if the threshold number of hops is 15, and the traceroute reaches the particular IP address in 20 hops, then audit platform 105 may determine that the fifth availability is "unavailable".

A trace performed in response to a traceroute command may terminate upon traversing a maximum number of hops, which may be a default amount (e.g., 30 hops), or may be specified along with the traceroute command. In some implementations, if the traceroute terminates without reaching the maximum number of hops, audit platform 105 may determine that the fifth availability is "unavailable". Additionally, or alternatively, if the traceroute terminates without reaching the maximum number of hops, audit platform 105 may determine that the fifth availability is "unknown". In some implementations, when providing the traceroute command, audit platform 105 may provide the maximum number of hops to be traversed.

As shown in FIG. 1K, and by reference number 170, audit platform 105 may calculate a confidence score indicating a confidence level that the particular IP address is available based on availabilities (e.g., the first availability, the second availability, the third availability, the fourth availability, and/or the fifth availability). In some implementations, audit platform 105 calculates the confidence score by assigning an availability score to each of the steps of the algorithm based on the availabilities. For example, audit platform 105 may assign a fourth availability score of 0% based on a fourth availability of "unavailable" (e.g., when a ping for the particular IP address receives a response that indicates the IP address is already assigned to an entity), may assign a fourth availability score of 100% based on a fourth availability of "available" (e.g., when a ping for the particular IP address receives a response that indicates the IP address is not already assigned), and may assign a fourth availability score of 50% based on a fourth availability of "unknown" (e.g., when a ping for the particular IP address receives no response). In some implementations, audit platform 105 may assign the availability score based on additional information (e.g., diagnostic information that is obtained in performing a corresponding step of the algorithm).

In some implementations, audit platform 105 may calculate the confidence score based on attributing equal significance to all five steps of the five-step IP address scanning model. Additionally, or alternatively, audit platform 105 may calculate weighted scores based on assigning weights to the availability scores for each of the first availability, the second availability, the third availability, the fourth availability, and the fifth availability, and may calculate the confidence score based on the weighted scores. For example, audit platform 105 may calculate the confidence score by giving greater significance to the third step and less significance to the fifth step, such as with weights of 20%, 20%, 30%, 20%, 10%. In this case, if only the third step indicates the particular IP address is not available (i.e., has an availability score of 0%) and all other steps indicate the particular IP address is available (i.e., each has an availability score of 100%), audit platform 105 may assign a confidence score of 70%. Similarly, if only the fifth step indicates the particular IP address is not available and all other steps indicate the particular IP address is available, audit platform 105 may assign a confidence score of 90%. In some implementations, audit platform 105 may adjust or determine the weights at least partly based on diagnostic information that is obtained in performing one or more of the steps of the algorithm.

As shown in FIG. 1L, and by reference number 175, audit platform 105 may perform one or more actions based on the confidence score. In some implementations, the one or more actions may include audit platform 105 allocating the particular IP address to a customer when the confidence score is one-hundred percent (100%). For example, audit platform 105 may allocate the particular IP address to a customer when all five steps of the five-step IP address scanning algorithm indicate that the particular IP address is available. In this way, audit platform 105 may ensure a high chance that the particular IP address will be available for use by the new customer. This, in turn, conserves computing resources, networking resources, human resources, and/or the like by minimizing the possibility that the particular IP address will be allocated to two different entities, as described herein.

In some implementations, the one or more actions include audit platform 105 allocating the particular IP address to a customer when the confidence score satisfies a threshold score. For example, if the threshold score is 80% and audit platform 105 calculates the confidence score to be 90%, the confidence score will satisfy the threshold score, and audit platform 105 will allocate the particular IP address to the customer. In this way, audit platform 105 may ensure a good chance that the particular IP address will be available for use by the new customer, while minimizing anomalous results from individual steps that might incorrectly indicate the particular IP address is not available.

In some implementations, the one or more actions include audit platform 105 identifying another particular IP address for a customer when the confidence score fails to satisfy a threshold score. For example, if the threshold score is 80% and audit platform 105 calculates the confidence score to be 70%, the confidence score will not satisfy the threshold score, and audit platform 105 will not allocate the particular IP address to the customer. In this case, audit platform 105 may select a new particular IP address as a candidate IP address to be assigned to the new customer, and may perform the five-step IP address scanning algorithm again with the new particular IP address.

In some implementations, the one or more actions include audit platform 105 marking the particular IP address as available when the confidence score is one-hundred percent (e.g., when all five steps of the five-step IP address scanning model indicate that the particular IP address is available), and/or marking the particular IP address as unavailable when the confidence score is less than one-hundred percent (e.g., when any of the five steps of the five-step IP address scanning model indicate that the particular IP address is unavailable). In some implementations, the one or more actions may include audit platform 105 marking the particular IP address as available when the confidence score satisfies a threshold score, and/or marking the particular IP address as unavailable when the confidence score fails to satisfy the threshold score. In this way, audit platform 105 may record the availability or unavailability of the particular IP address for use by another system or individual (e.g., associated with a product or service provider) that assigns the particular IP address to a new customer.

In this way, the audit platform reduces the possibility that a customer will be allocated an IP address that is already allocated to another entity, which reduces the chance of the same IP address being used by two different entities, and thus reduces the chance that data will be received by the wrong entity, will not be received by the correct entity, and/or the like. As a result, the audit platform conserves computing resources (e.g., processing resources, memory resources, communication resources, and/or the like), and/or the like that would otherwise be wasted due to an inability to perform important functions that require the data, additional efforts required to obtain and/or re-send the data, lost business due to dissatisfied customers, compromised security due to the data being sent to the wrong entity, and/or the like.

As indicated above, FIGS. 1A-1L are provided as an example. Other examples may differ from what is described with regard to FIGS. 1A-1L. The number and arrangement of devices shown in FIGS. 1A-1L are provided as an example. In practice, there may be additional devices, fewer devices, different devices, or differently arranged devices than those shown in FIGS. 1A-1L. Furthermore, two or more devices shown in FIGS. 1A-1L may be implemented within a single device, or a single device shown in FIGS. 1A-1L may be implemented as multiple, distributed devices. Additionally, or alternatively, a set of devices (e.g., one or more devices) shown in FIGS. 1A-1L may perform one or more functions described as being performed by another set of devices shown in FIGS. 1A-1L.

Figure 2:
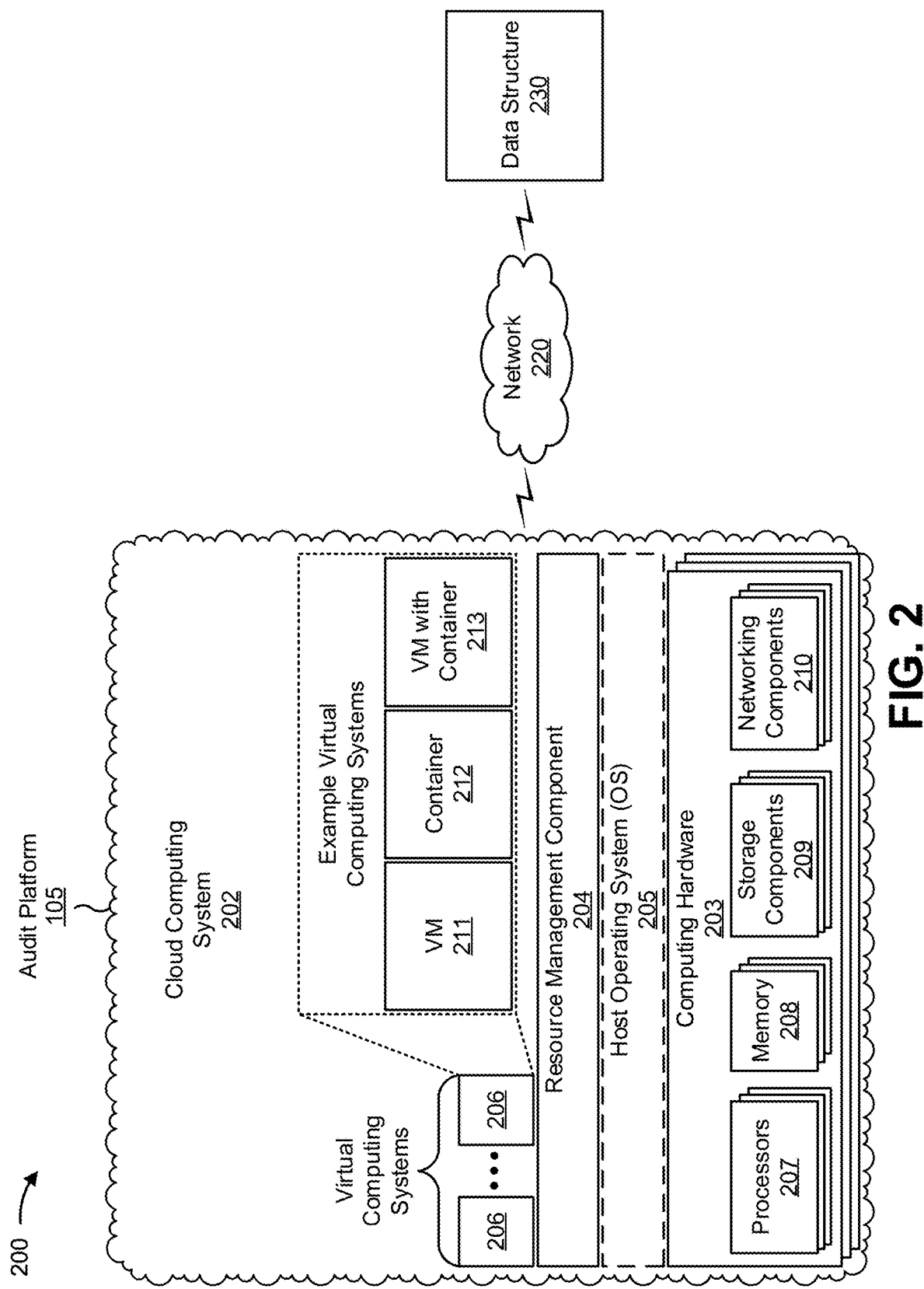
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include audit platform 105, which may include one or more elements of and/or may execute within a cloud computing system 202. The cloud computing system 202 may include one or more elements 203-213, as described in more detail below. As further shown in FIG. 2, environment 200 may include network 220, data structure 230, and/or the like. Devices and/or elements of environment 200 may interconnect via wired, wireless or optical connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the audit platform 105 may include one or more elements 203-213 of the cloud computing system 202, may execute within the cloud computing system 202, and/or may be hosted within the cloud computing system 202, in some implementations, the audit platform 105 may not be cloud-based (e.g., may be implemented outside of a cloud computing system) or may be partially cloud-based. For example, the audit platform 105 may include one or more devices that are not part of the cloud computing system 202, such as device 300 of FIG. 3, which may include a stand-alone server or another type of computing device. The audit platform 105 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

Data structure 230 includes one or more data structures, each of which may include a database, a table, a linked list, a tree, a record, an array, an index, a graph, and/or the like. For example, data structure 230 may include wireless/wireline IP management data structure 102 (e.g., an INAM database), IP contact and registration data structure 122 (e.g., an ARIN database), backbone router 132, and/or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
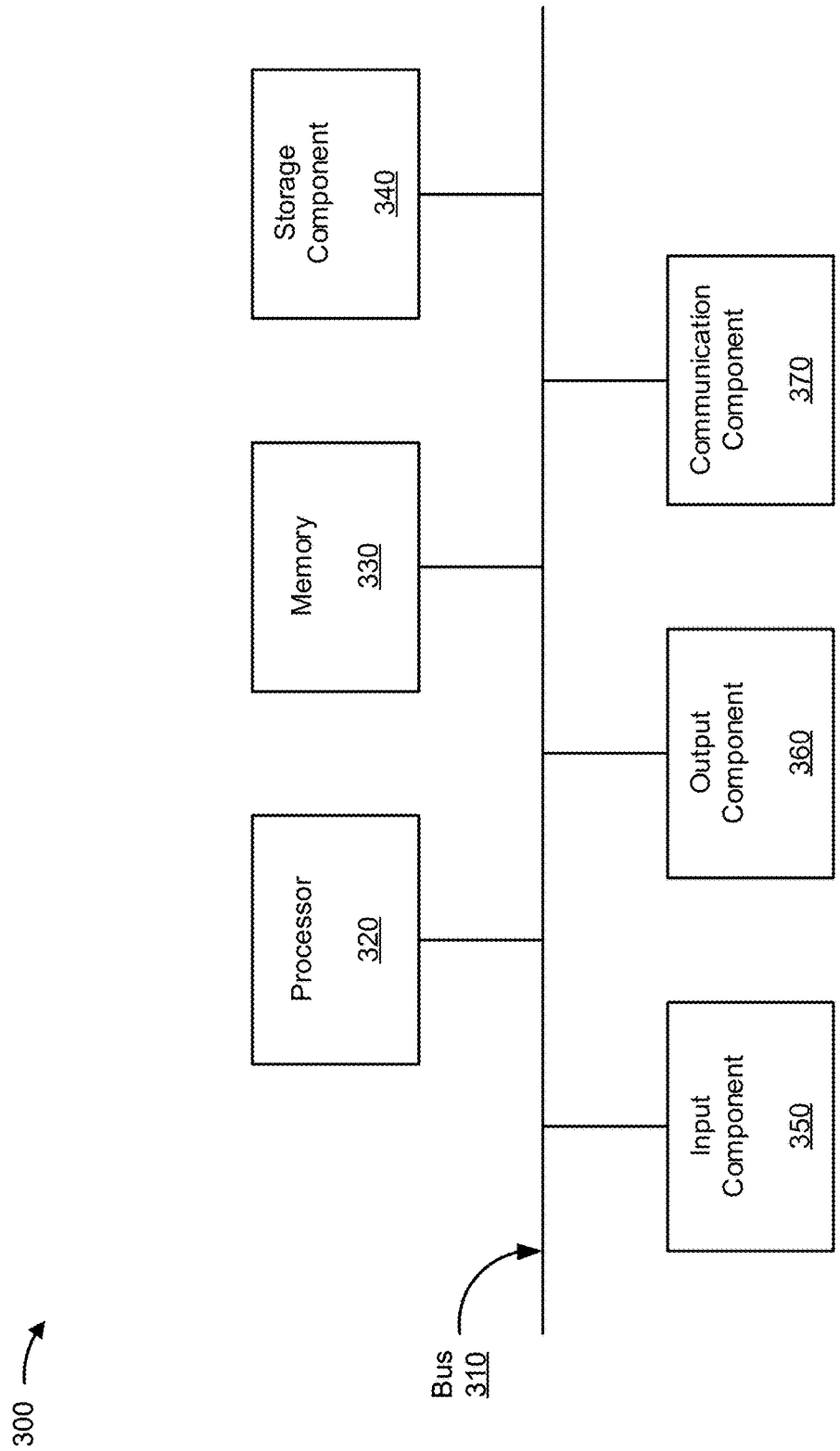
FIG. 3 is a diagram of example components of one or more devices of FIG. 2.

FIG. 3 is a diagram of example components of a device 300, which may correspond to audit platform 105 and/or data structure 230. In some implementations, audit platform 105 and/or data structure 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory), a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
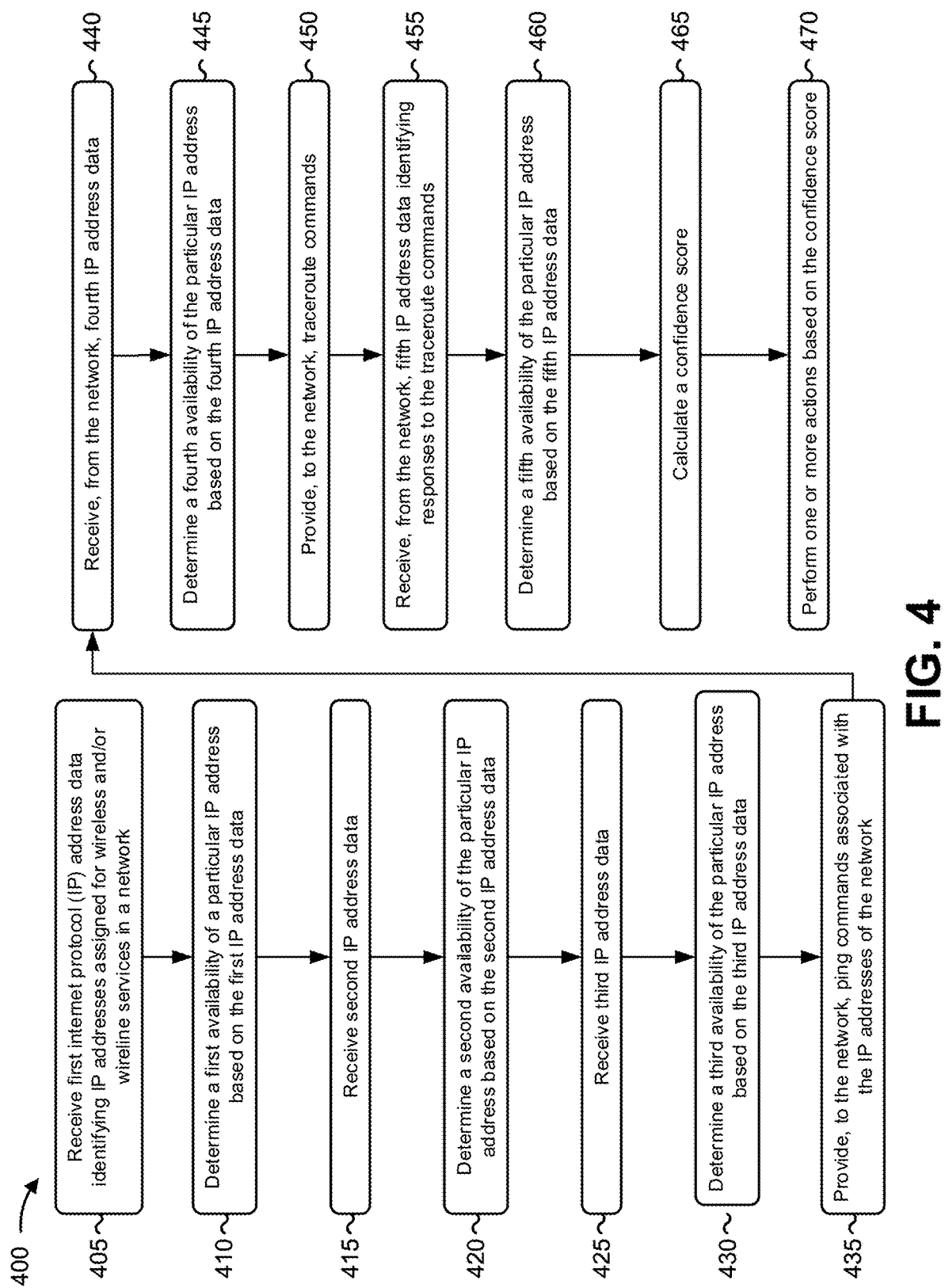
FIG. 4 is a flow chart of an example process relating to utilizing an IP address scanning model to identify an available IP address for a new customer.

FIG. 4 is a flow chart of an example process 400 associated with utilizing an IP address scanning model to identify an available IP address for a new customer. In some implementations, one or more process blocks of FIG. 4 may be performed by an audit platform (e.g., audit platform 105). In some implementations, one or more process blocks of FIG. 4 may be performed by another device or a group of devices separate from or including the audit platform, such as a data structure (e.g., data structure 230), and/or the like. Additionally, or alternatively, one or more process blocks of FIG. 4 may be performed by one or more components of a device 300, such as processor 320, memory 330, storage component 340, input component 350, output component 360, communication component 370, and/or the like.

As shown in FIG. 4, process 400 may include receiving first Internet protocol (IP) address data identifying IP addresses assigned for wireless and/or wireline services in a network (block 405). For example, the audit platform may receive first Internet protocol (IP) address data identifying IP addresses assigned for wireless and/or wireline services in a network, as described above. The audit platform may receive the first IP address data from a wireless/wireline IP management data structure (e.g., wireless/wireline IP management data structure 102).

As further shown in FIG. 4, process 400 may include determining a first availability of a particular IP address based on the first IP address data (block 410). For example, the audit platform may determine a first availability of a particular IP address based on the first IP address data, as described above. When determining the first availability of the particular IP address, the audit platform may compare the particular IP address and the first IP address data, and may determine the first availability based on comparing the particular IP address and the first IP address data.

As further shown in FIG. 4, process 400 may include receiving second IP address data (block 415). For example, the audit platform may receive second IP address data identifying contact and registration information for IP addresses in the network, as described above. The audit platform may receive the second IP address data from an IP contact and registration data structure (e.g., IP contact and registration data structure 122).

As further shown in FIG. 4, process 400 may include determining a second availability of the particular IP address based on the second IP address data (block 420). For example, the audit platform may determine a second availability of the particular IP address based on the second IP address data, as described above. When determining the second availability of the particular IP address, the audit platform may compare the particular IP address and the second IP address data, and may determine the second availability based on comparing the particular IP address and the second IP address data.

As further shown in FIG. 4, process 400 may include receiving third IP address data (block 425). For example, the audit platform may receive third IP address data identifying active IP addresses associated with a backbone router of the network (e.g., backbone router 132), as described above. In some implementations, the audit platform determines router feed keywords and IP address keywords associated with the backbone router. For example, audit platform may provide, to the backbone router, a query that identifies the router feed keywords and the IP address keywords, and may receive, from the backbone router, the third IP address data identifying the active IP addresses associated with the backbone router of the network based on the query.

As further shown in FIG. 4, process 400 may include determining a third availability of the particular IP address based on the third IP address data (block 430). For example, the audit platform may determine a third availability of the particular IP address based on the third IP address data, as described above. When determining the third availability of the particular IP address, the audit platform may compare the particular IP address and the third IP address data, and may determine the third availability of the particular IP address based on comparing the particular IP address and the third IP address data.

As further shown in FIG. 4, process 400 may include providing, to the network, ping commands associated with the IP addresses of the network (block 435). For example, the audit platform may provide, to the network, ping commands associated with the IP addresses of the network, as described above.

As further shown in FIG. 4, process 400 may include receiving, from the network, fourth IP address data (block 440). For example, the audit platform may receive, from the network, fourth IP address data identifying responses to the ping commands, as described above. When receiving the fourth IP address data identifying responses to the ping commands, the audit platform may receive one or more responses, to the ping commands, indicating a one-hundred percent packet loss associated with a corresponding one or more of the IP addresses of the network. The audit platform may receive another one or more responses, to the ping commands, indicating less than a one-hundred percent packet loss associated with another corresponding one or more of the IP addresses of the network.

As further shown in FIG. 4, process 400 may include determining a fourth availability of the particular IP address based on the fourth IP address data (block 445). For example, the audit platform may determine a fourth availability of the particular IP address based on the fourth IP address data, as described above. When determining the fourth availability of the particular IP address, the audit platform may compare the particular IP address and the fourth IP address data, and may determine the fourth availability of the particular IP address based on comparing the particular IP address and the fourth IP address data.

As further shown in FIG. 4, process 400 may include providing, to the network, traceroute commands (block 450). For example, the audit platform may provide, to the network, traceroute commands associated with the IP addresses of the network, as described above.

As further shown in FIG. 4, process 400 may include receiving, from the network, fifth IP address data identifying responses to the traceroute commands (block 455). For example, the audit platform may receive, from the network, fifth IP address data identifying responses to the traceroute commands, as described above. When receiving the fifth IP address data identifying responses to the traceroute commands, the audit platform may receive one or more responses, to the traceroute commands, indicating greater than or equal to a threshold quantity of hops associated with a corresponding one or more of the IP addresses of the network. The audit platform may receive another one or more responses, to the traceroute commands, indicating less than the threshold quantity of hops associated with another corresponding one or more of the IP addresses of the network.

As further shown in FIG. 4, process 400 may include determining a fifth availability of the particular IP address based on the fifth IP address data (block 460). For example, the audit platform may determine a fifth availability of the particular IP address based on the fifth IP address data, as described above.

As further shown in FIG. 4, process 400 may include calculating a confidence score (block 465). For example, the audit platform may calculate a confidence score, indicating a confidence level that the particular IP address is available, based on the first availability, the second availability, the third availability, the fourth availability, and the fifth availability, as described above. When calculating the confidence score, the audit platform may assign weights to each of the first availability, the second availability, the third availability, the fourth availability, and the fifth availability. The audit platform may calculate weighted scores based on assigning the weights, and may calculate the confidence score based on the weighted scores.

As further shown in FIG. 4, process 400 may include performing one or more actions based on the confidence score (block 470). For example, the audit platform may perform one or more actions based on the confidence score, as described above. The one or more actions may include allocating the particular IP address to a customer when the confidence score is one-hundred percent, allocating the particular IP address to a customer when the confidence score satisfies a threshold score, and/or identifying another particular IP address for a customer when the confidence score fails to satisfy the threshold score. Additionally, or alternatively, performing the one or more actions may include marking the particular IP address on a list as available when the confidence score is one-hundred percent, marking the particular IP address on the list as unavailable when the confidence score is less than one-hundred percent, marking the particular IP address on the list as available when the confidence score satisfies a threshold score, and/or marking the particular IP address on the list as unavailable when the confidence score fails to satisfy the threshold score.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, first Internet protocol (IP) address data identifying IP addresses assigned for services in a network;
   determining, by the device, a first availability of a particular IP address based on the first IP address data;
   receiving, by the device, second IP address data identifying contact and registration information for IP addresses in the network;
   determining, by the device, a second availability of the particular IP address based on the second IP address data;
   receiving, by the device, third IP address data identifying active IP addresses associated with a backbone router of the network;
   determining, by the device, a third availability of the particular IP address based on the third IP address data;
   providing, by the device and to the network, ping commands associated with the IP addresses of the network;
   receiving, by the device and from the network, fourth IP address data identifying responses to the ping commands;
   determining, by the device, a fourth availability of the particular IP address based on the fourth IP address data;
   providing, by the device and to the network, traceroute commands associated with the IP addresses of the network;
   receiving, by the device and from the network, fifth IP address data identifying responses to the traceroute commands;
   determining, by the device, a fifth availability of the particular IP address based on the fifth IP address data;
   calculating, by the device, a confidence score, indicating a confidence level that the particular IP address is available, based on the first availability, the second availability, the third availability, the fourth availability, and the fifth availability; and
   performing, by the device, one or more actions based on the confidence score.

2. The method of claim 1, wherein performing the one or more actions includes one or more of:
   allocating the particular IP address to a customer when the confidence score satisfies a threshold score; or
   identifying another particular IP address for a customer when the confidence score fails to satisfy the threshold score.

3. The method of claim 1, wherein performing the one or more actions includes one or more of:
   marking the particular IP address on a list as available when the confidence score satisfies a threshold score; or
   marking the particular IP address on the list as unavailable when the confidence score fails to satisfy the threshold score.

4. The method of claim 1, wherein calculating the confidence score comprises:
   assigning weights to each of the first availability, the second availability, the third availability, the fourth availability, and the fifth availability;
   calculating weighted scores based on assigning the weights to each of the first availability, the second availability, the third availability, the fourth availability, and the fifth availability; and
   calculating the confidence score based on the weighted scores.

5. The method of claim 1, wherein receiving the third IP address data identifying the active IP addresses associated with the backbone router of the network comprises:
   determining router feed keywords and IP address keywords associated with the router;
   providing, to the backbone router, a query that identifies the router feed keywords and the IP address keywords; and
   receiving, from the backbone router, the third IP address data identifying the active IP addresses associated with the backbone router of the network based on the query.

6. The method of claim 1, wherein receiving the fourth IP address data identifying responses to the ping commands comprises:
receiving one or more responses, to the ping commands, indicating a one-hundred percent packet loss associated with a corresponding one or more of the IP addresses of the network; and
receiving another one or more responses, to the ping commands, indicating less than a one-hundred percent packet loss associated with another corresponding one or more of the IP addresses of the network.

7. The method of claim 1, wherein receiving the fifth IP address data identifying responses to the traceroute commands comprises:
receiving one or more responses, to the traceroute commands, indicating greater than or equal to a threshold quantity of hops associated with a corresponding one or more of the IP addresses of the network; and
receiving another one or more responses, to the traceroute commands, indicating less than the threshold quantity of hops associated with another corresponding one or more of the IP addresses of the network.

8. A device, comprising:
one or more processors configured to:
receive first Internet protocol (IP) address data identifying IP addresses assigned for services in a network;
determine a first availability of a particular IP address based on the first IP address data;
receive second IP address data identifying contact and registration information for IP addresses in the network;
determine a second availability of the particular IP address based on the second IP address data;
receive third IP address data identifying active IP addresses associated with a backbone router of the network;
determine a third availability of the particular IP address based on the third IP address data;
provide, to the network, ping commands associated with the IP addresses of the network;
receive, from the network, fourth IP address data identifying responses to the ping commands;
determine a fourth availability of the particular IP address based on the fourth IP address data;
provide, to the network, traceroute commands associated with the IP addresses of the network;
receive, from the network, fifth IP address data identifying responses to the traceroute commands;
determine a fifth availability of the particular IP address based on the fifth IP address data;
calculate a confidence score, indicating a confidence level that the particular IP address is available, based on the first availability, the second availability, the third availability, the fourth availability, and the fifth availability; and
selectively:
allocate the particular IP address to a customer when the confidence score satisfies a threshold score, or identify another particular IP address for the customer when the confidence score fails to satisfy the threshold score.

9. The device of claim 8, wherein the one or more processors, when receiving the first IP address data identifying the IP addresses assigned for the services in the network, are configured to:
receive the first IP address data from a wireless/wireline IP management data structure, wherein the first IP address data identifies IP addresses assigned for wireless and/or wireline services in a network.

10. The device of claim 8, wherein the one or more processors, when receiving the second IP address data identifying the contact and registration information for the IP addresses in the network, are configured to:
receive the second IP address data from an IP contact and registration data structure.

11. The device of claim 8, wherein the one or more processors, when determining the first availability of the particular IP address based on the first IP address data, are configured to:
compare the particular IP address and the first IP address data; and
determine the first availability of the particular IP address based on comparing the particular IP address and the first IP address data.

12. The device of claim 8, wherein the one or more processors, when determining the second availability of the particular IP address based on the second IP address data, are configured to:
compare the particular IP address and the second IP address data; and
determine the second availability of the particular IP address based on comparing the particular IP address and the second IP address data.

13. The device of claim 8, wherein the one or more processors, when determining the third availability of the particular IP address based on the third IP address data, are configured to:
compare the particular IP address and the third IP address data; and
determine the third availability of the particular IP address based on comparing the particular IP address and the third IP address data.

14. The device of claim 8, wherein the one or more processors, when determining the fourth availability of the particular IP address based on the fourth IP address data, are configured to:
compare the particular IP address and the fourth IP address data; and
determine the fourth availability of the particular IP address based on comparing the particular IP address and the fourth IP address data.

15. A non-transitory computer-readable medium storing instructions, the instructions comprising:
one or more instructions that, when executed by one or more processors, cause the one or more processors to:
determine a first availability of a particular Internet protocol (IP) address based on first IP address data identifying IP addresses assigned for services in a network;
determine a second availability of the particular IP address based on second IP address data identifying contact and registration information for IP addresses in the network;
determine a third availability of the particular IP address based on third IP address data identifying active IP addresses associated with a backbone router of the network;
provide, to the network, ping commands associated with the IP addresses of the network;
receive, from the network, fourth IP address data identifying responses to the ping commands;
determine a fourth availability of the particular IP address based on the fourth IP address data;

provide, to the network, traceroute commands associated with the IP addresses of the network;
receive, from the network, fifth IP address data identifying responses to the traceroute commands;
determine a fifth availability of the particular IP address based on the fifth IP address data;
calculate a confidence score, indicating a confidence level that the particular IP address is available, based on the first availability, the second availability, the third availability, the fourth availability, and the fifth availability; and
perform one or more actions based on the confidence score.

16. The non-transitory computer-readable medium of claim 15, wherein performing the one or more actions includes one or more of:
allocate the particular IP address to a customer when the confidence score is one-hundred percent;
allocate the particular IP address to a customer when the confidence score satisfies a threshold score;
identify another particular IP address for a customer when the confidence score fails to satisfy the threshold score;
mark the particular IP address on a list as available when the confidence score is one-hundred percent;
mark the particular IP address on the list as unavailable when the confidence score is less than one-hundred percent;
mark the particular IP address on the list as available when the confidence score satisfies the threshold score; or
mark the particular IP address on the list as unavailable when the confidence score fails to satisfy the threshold score.

17. The non-transitory computer-readable medium of claim 15, wherein the one or more instructions, that cause the one or more processors to calculate the confidence score, cause the one or more processors to:
assign weights to each of the first availability, the second availability, the third availability, the fourth availability, and the fifth availability;
calculate weighted scores based on assigning the weights to each of the first availability, the second availability, the third availability, the fourth availability, and the fifth availability; and
calculate the confidence score based on the weighted scores.

18. The non-transitory computer-readable medium of claim 15, wherein the instructions further comprise:
one or more instructions that, when executed by the one or more processors, cause the one or more processors to:
determine router feed keywords and IP address keywords associated with the backbone router;
provide, to the backbone router, a query that identifies the router feed keywords and the IP address keywords; and
receive, from the backbone router, the third IP address data identifying the active IP addresses associated with the backbone router of the network based on the query.

19. The non-transitory computer-readable medium of claim 15, wherein the one or more instructions, that cause the one or more processors to receive the fourth IP address data identifying responses to the ping commands, cause the one or more processors to:
receive one or more responses, to the ping commands, indicating a one-hundred percent packet loss associated with a corresponding one or more of the IP addresses of the network; and
receive another one or more responses, to the ping commands, indicating less than a one-hundred percent packet loss associated with another corresponding one or more of the IP addresses of the network.

20. The non-transitory computer-readable medium of claim 15, wherein the one or more instructions, that cause the one or more processors to receive the fifth IP address data identifying responses to the traceroute commands, cause the one or more processors to:
receive one or more responses, to the traceroute commands, indicating greater than or equal to a threshold quantity of hops associated with a corresponding one or more of the IP addresses of the network; and
receive another one or more responses, to the traceroute commands, indicating less than the threshold quantity of hops associated with another corresponding one or more of the IP addresses of the network.

* * * * *